Jan. 3, 1967 J. R. HICKS ETAL 3,296,545

STAGGER-TUNED AUDIO AMPLIFIER

Filed May 27, 1964

INVENTORS
JOHN R. HICKS
JOE C. WILSON
BY Howard J. Murray, Jr. AGENT
George J. Rubens ATTORNEY United States Patent Office 3,296,545

Patented Jan. 3, 1967

3,296,545

STAGGER-TUNED AUDIO AMPLIFIER

John R. Hicks, Oxnard, and Joe C. Wilson, Ventura, Calif., assignors to the United States of America as represented by the Secretary of the Navy Filed May 27, 1964, Ser. No. 370,742
1 Claim. (Cl. 330—21)

Figure 1:
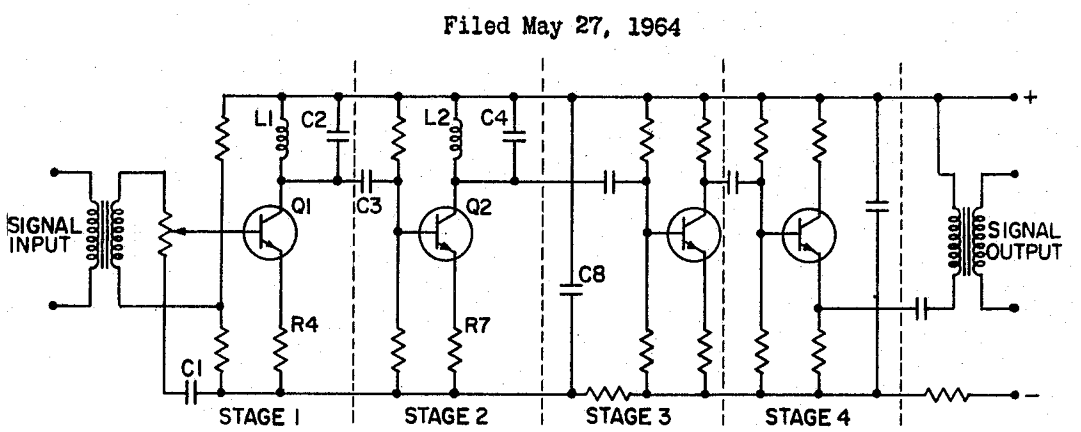

The invention described herein may be manufactured and used by or for the Government of the United States of America for governmental purposes without the payment of any royalities thereon or therefor.

The present invention relates to audio amplifiers as employed in communication networks. The invention is particularly directed to those types of communication networks having a plurality of terminals any two of which may be joined by a standard telephone line, or, alternatively, additional terminals may be interconnected at the same time so that the system becomes in effect of the "conference" type.

In voice-communication arrangements of the nature under consideration, it is frequently desirbale to bring together two or more terminal points. When only two of such points are joined, the required degree of amplification of the voice signal need only be at a minimum. However, as the number of interconnected terminal points increases, it is necessary to correspondingly increase the amount by which the signal is amplified in order to raise it to an intelligible level at all of the network outlets. Consequently, the amplifying units employed in the system must be capable of being used either single or in multiple as the particular operating circumstances may dictate.

At the present time these amplifiers are not completely satisfactory because of certain characteristics inherent therein. For optimum voice transmission, the response curve of the amplifier must be essentially flat over the entire frequency range of the audio signal. In the environment with which the present invention is concerned, this frequency range extends from approximately 200 cycles per second to an upper limit of 4000 cycles per second. The equipment now in use is intentionally designed with a passband which exceeds this range, inasmuch as the employment of a number of amplifying units in series causes the overall bandwidth of the combination to shrink, or become narrower, in comparison with the passband of any one amplifying stage. This is a well-known characteristic of audio amplifiers, and is undesirable in that the wide band nature of each unit permits noise and other spurious energy to reach the output of the amplifier, where it causes interference with the intelligence signal. Still further, the inherent characteristics of any arrangement employing a plurality of series-connected amplifiers is that the overall bandwidth of the combination can become quite small, and, where a sufficiently large number of stages are utilized, reaches a point where only a portion of the input signal is passed thereby.

A still further disadvantage present in systems now being utilized to achieve such results is that each amplifying stage should have an amplitude vs. frequency curve which extends into the low-frequency portion of the spectrum in order to pass intelligence in this region. However, the input and output transformers which are required for such operation must of necessity possess relatively large cores. These large transformer cores not only increase the weight of the apparatus and preclude any miniaturization thereof but also obviously raise the total cost of manufacture.

The present invention employs the so-called "stagger-tuner" concept in a multi-stage audio amplifier. Such a procedure is not unkown in high-frequency communication systems, but heretofore it has not been utilized in audio applications due to the difficulty of maintaining a constant response as the frequency of the input signal varies throughout its range. The present disclosure recognizes such a condition and provides means whereby the output of each amplifier stage may be predetermined and correlated with the response of each other stage so that the overall output of the amplifier unit remains essentially flat throughout the entire range of the input signal.

In accordance with a freature of the present invention, a multi-stage amplifier is provided in which a maximally flat response is obtained and which at the same time possesses good noise-rejection characteristics. In a preferred design, a plurality of stages are cascaded, with each stage being tuned so as to peak in a different portion of the frequency range occupied by the input signal. The high selectivity of each stage eliminates much of the noise which may be present in the system from reaching the output terminals of the amplifier, while at the same time no appreciable decrease in bandwidth occurs regardless of any reasonable number of stages which are so cascaded. As a still further feature, the present concept eliminates the necessity for employing voltage feedback, which, when present, has a tendency to produce oscillation unless relatively complex precautions are taken.

One object of the present invention, therefore, is to provide an improved form of amplifier especially adapted for audio applications.

Another object of the invention is to provide a multi-stage audio amplifier in which the various stages are stagger-tuned so that overall response of the amplifier remains flat over the frequency range of the input signal.

A still further object of the invention is to provide an audio amplifier in which the various stages thereof are cascaded without resulting in any appreciable reduction in bandwidth, while at the same time increasing the selectivity of the device to thereby improve its overall signal-to-noise ratio.

Figure 2:
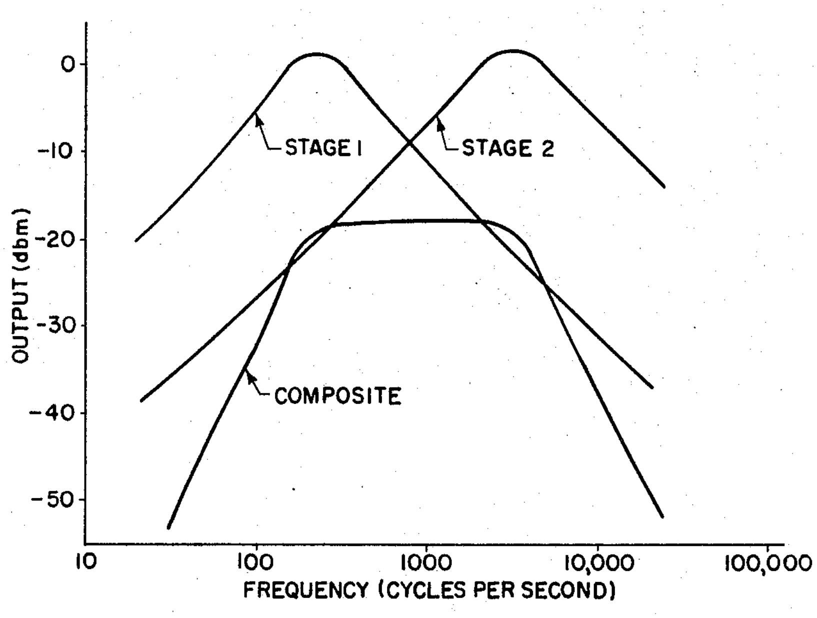

Other objects, advantages, and novel features of the invention will become apparent from the following detailed description of the invention when considered in conjunction with the accompanying drawings wherein:

FIG. 1 is a schematic diagram of a preferred form of audio amplifier designed in accordance with the principles of the present invention, including two stagger-tuned input stages together with a pair of power stages the sole purpose of which is to raise the gain of the apparatus; and FIG. 2 is a chart showing the respective characteristic curves of the two input stages of the amplifier of FIG. 1 with output plotted against frequency, together with a composite frequency-response curve of the two stages as a unit.

Referring now to FIG. 1 of the drawings, there is illustrated a four-stage audio amplifier designed to incorporate the concept herein presented. For the purpose of the present description, only the first two stages are of interest, since these control the frequency characteristics of the amplifier. The first stage includes a transistor Q1 to the base electrode of which is applied an audio signal through a standard coupling transformer $T_1$. As shown, the collector electrode of transistor $Q_1$ is connected to a source of positive potential through a parallel tuned LC circuit consisting of the inductor $L_1$ and the capacitor $C_2$, while the emitter electrode of transistor $Q_1$ is joined to a negative potential point through the resistor $R_4$. The value of each element above-mentioned is determined in a manner to be subsequently described, so that the first amplifier stage is tuned to a frequency represented by the designated response curve of FIG. 2, and has a peak at approximately 200 cycles per second.

The second stage of the amplifier of FIG. 1 includes a further transistor $Q_2$ the base electrode of which receives the output of transistor $Q_1$ through a coupling capacitor $C_3$. In a manner somewhat similar to that of stage #1, the collector electrode of transistor $Q_2$ is connected to a positive potential point through the parallel combination of an inductor $L_2$ and a capacitor $C_4$. A still further capacitor $C_8$ is connected directly across the positive and negative power supply conductors in the manner illustrated, while a resistor $R_7$ joins the emitter electrode of transistor $Q_2$ to a negative potential point. The second stage of the amplifier is tuned in a manner also to be hereinafter set forth so as to possess a response curve such as shown in FIG. 2 of the drawings, this curve peaking at a frequency of approximately 4000 cycles per second. It will now be recognized that the numerical addition of the individual curves of FIG. 2 produces a composite curve which as shown is essentially flat throughout the range between 200 cycles per second and 4,000 cycles per second. An amplifier constructed along the lines described has been found to possess a nominal gain of 30 db, with a distortion of less than 3% and with a maximum output of +5 dbm.

Although the basic principle of the present invention resides in the stagger-tuning of the first two amplifier stages of the circuit of FIG. 1 so that each stage possesses a frequency response curve which may be combined with that of the remaining stage to thereby result in a composite frequency characteristic which is essentially uniform over the passband of interest, nevertheless it is believed that a presentation of the manner in which the values of the individual components are arrived at would be helpful in bringing out other unique aspects of the present concept. As a basis for such a description, a number of definitions and relationships are necessary in order to thoroughly understand the procedures and techniques which are made use of in setting up the design requirements. For example:

$f_0$=the center frequency of the overall amplifier of FIG. 1.
$f_1$=the center frequency of the first stage including transistor $Q_1$.
$f_{1_0}$=the desired lower −3 db point (see FIG. 2).
$f_2$=the center frequency of the second stage including transistor $Q_2$.
$f_{2_0}$=the desired upper −3 db point.
$\Delta f$=bandwidth of overall amplifier.
$d=1/Q$=dissipation factor of each stage.
$\alpha$=factor relating $f_1$, $f_2$ and $f_0$.
$\delta$=total dissipation factor.

$$f_1=\frac{f_0}{\alpha} \quad (1)$$

$$f_2=\alpha f_0 \quad (2)$$

$$\Delta f=\delta f_0 \quad (3)$$

$$\Delta f_1=df_1 \quad (4)$$

$$\Delta f_2=df_2 \quad (5)$$

$$d=\sqrt{\frac{4+\delta^2-\sqrt{16+\delta^4}}{2}} \quad (6)$$

$$\alpha-\frac{1}{\alpha}=\sqrt{\delta^2-d^2} \quad (7)$$

The following steps were followed in the design of the stagger-tuned amplifier of FIG. 1:

(1) The desired −3 db points were chosen (see FIG. 2)

$$f_1=200 \text{ c.p.s.}, f_{20}=4{,}000 \text{ c.p.s.}$$

(2) $\Delta f$ and $f_0$ were found by $$\Delta f=f_{20}-f_{1_0} \quad (8)$$

$$f_0=\sqrt{f_{10}f_1} \quad (9)$$

(3) The dissipation factor of the staggered pair was determined by Equation 3

$$\delta=\frac{\Delta f}{f_0}$$

(4) Values of $d$ and $\alpha$ were derived by Equations 6 and 7

$$d=\frac{1}{Q}=\sqrt{\frac{4+\delta^2-\sqrt{16-\delta^4}}{2}}$$

$$\alpha-\frac{1}{\alpha}=\sqrt{\delta^2-d^2}$$

(5) Values of $f_1$ and $f_2$ were then determined by Equations 1 and 2

$$f_1=\frac{f_0}{\alpha}$$

$$f_2=\alpha f_0$$

(6) Values of inductances $L_1$ and $L_2$ were then derived from the definition of a tuned circuit:

$$L_1=\frac{1}{(2\pi f_1^2)C_1} \quad (10)$$

$$L_2=\frac{1}{(2\pi f_2^2)C_2} \quad (11)$$

with the values of $C_1$ and $C_2$ being selected arbitrarily.

(7) The resistors to control the Q of each stage were determined by the following equations:

$$R_1=\frac{1}{2\pi f_1 C_1 d} \quad (12)$$

$$R_2=\frac{1}{2\pi f_2 C_2 d} \quad (13)$$

In practice, the frequency response of the maximally flat amplifier in FIG. 1 closely corresponds to the results which might be expected from the derivations above set forth. FIGURE 2 shows the response for the first stage of the amplifier, the response for the second stage, and the composite response for both stages in cascade. The flat response of the latter curve throughout the input signal range is due to the addition of the magnitudes of two curve portions of equal and opposite slope. Inasmuch as the Q of any particular stage determines the slope of the curve roll-off, then it follows that if both stages have the same Q, the flat response section of the composite curve will be produced. It might be mentioned that the desired values for the respective −3 db points on the composite response curve were 200 and 4000 c.p.s. Reference to FIG. 2 shows that the actual points fall at 192 and 3800 c.p.s., which very closely approximate the theoretical optima. However, it will be recognized that these −3 db points will vary slightly from one amplifier to another because of the tolerance of the frequency-determining components.

The composite curve of FIG. 2 represent a condition where two amplifier stages are cascaded. If a greater number of stages are connected in this manner, the output characteristic will change only slightly for as many as six stages, and even for eight the high-frequency end of the curve will rise to only 1.8 db. This is because (referring to FIG. 2) the maximum gain of the second stage is 0.5 db greater than that of the first stage, this difference being caused by the fact that the low-frequency loss in the inductor $L_1$ is greater than the high-frequency loss in the inductor $L_2$. As more stages are cascaded, this difference becomes of greater significance in the upper-frequency portion of the response curve. However, this deviation from a flat characteristic can be largely overcome by a careful matching of the Q's of the respective stages. In any instances, however, this rise in high-frequency response is actually desirable, inasmuch as it yields high-frequency compensation.

The circuit of FIG. 1 requires D.C. input power of only 24 volts at 20 ma. The transistors $Q_1$ and $Q_2$ (as well as the transistors of the succeeding power stages) are of the silicon type for stability of operation at high temperatures. Cross-talk from one stage to another is extremely low and seldom exceeds −60 db. One preferred method of manufacture is to package two amplifying units of the type shown in FIG. 1 on an 8" x 3¼" printed circuit card. Since the maximum component height does not exceed 7/16", modules having a width of only 11/16" can be employed with a considerable saving in space requirements.

The following values for certain of the components of FIG. 1 have been employed in practice and have been found to be especially suitable for the purpose intended:

| | |
|---|---|
| Transistors $Q_1$ and $Q_2$ | 2N697 |
| Inductor $L_1$ | .600 H. |
| Resistor $R_4$ | 100 ohms. |
| Capacitor $C_2$ | 1 mf. |
| Capacitor $C_3$ | 10 mf. |
| Inductor $L_2$ | .05 H. |
| Resistor $R_7$ | 100 ohms. |
| Capacitor $C_4$ | .039 mf. |
| Capacitor $C_8$ | 175 mf. |
| Capacitor $C_1$ | 10 mf. |

Obviously many modifications and variations of the present invention are possible in the light of the above teachings. It is therefore to be understood that within the scope of the appended claim the invention may be practiced otherwise than as specifically described.

We claim:

Apparatus for amplifying an input signal which extends over a range lying in the audio portion of the frequency spectrum, said apparatus comprising:

a first transistor having emitter, base and collector electrodes;

means for applying said input signal to the base electrode of said first transistor;

a source of positive potential;

a first inductor;

means connecting the collector electrode of said first transistor to said source of positive potential through said first inductor;

a first capacitor connected in parallel with said first inductor to thereby form a resonant network;

a source of negative potential;

a first resistor;

means connecting the emitter electrode of said first transistor to said source of negative potential through said first resistor;

said first transistor, first inductor, first capacitor and first resistor together constituting the first stage of said amplifying apparatus and having an amplitude vs. frequency characteristic which reaches a maximum near the lower limit of the range over which the said input signal extends;

a second transistor having collector, base and emitter electrodes;

means for applying the output of said first amplifier stage as derived from the collector electrode of said first transistor to the base electrode of said second transistor;

a second inductor connecting the collector electrode of said second transistor to the said source of positive potential;

a second capacitor connected in parallel relationship with said second inductor to thereby form a resonant network;

a second resistor; and means connecting the emitter electrode of said second transistor to said source of negative potential through said second resistor;

said second transistor, second inductor, second capacitor and second resistor constituting the second stage of said amplifying apparatus and having an amplitude vs. frequency characteristic which reaches a maximum near the upper limit of that portion of the frequency spectrum over which the said input signal extends, both said first and second amplifier stages being connected in cascade, and with the circuit values of the components of both said first and second amplifier stages being determined in accordance with the following formulae based upon the showing of FIG. 1 of the drawings:

$f_0$=the center frequency of the overall amplifier.

$f_1$=the center frequency of the first stage including transistor $Q_1$.

$f_{1_0}$=the desired lower −3 db point.

$f_2$=the center frequency of the second stage including transistor $Q_2$.

$f_{2_0}$=the desired upper −3 db point.

$\Delta f$=bandwidth of overall amplifier.

$d=1/Q$=dissipation factor of each stage.

$\alpha$=factor relating $f_1$, $f_2$ and $f_0$.

$\delta$=total dissipation factor.

$$f_1=\frac{f_0}{\alpha} \quad (1)$$

$$f_2=\alpha f_0 \quad (2)$$

$$\Delta f=\delta f_0 \quad (3)$$

$$\Delta f_1=d f_1 \quad (4)$$

$$\Delta f_2=d f_2 \quad (5)$$

$$d=\sqrt{\frac{4+\delta^2-\sqrt{16+\delta^4}}{2}} \quad (6)$$

$$\alpha-\frac{1}{\alpha}=\sqrt{\delta^2-d^2} \quad (7)$$

With the −3 db points being chosen so that $f_{1_0}=200$ c.p.s. and $f_{2_0}=4{,}000$ c.p.s., then $\Delta f$ and $f_0$ are found by $$\Delta f=f_{2_0}-f_{1_0} \quad (8)$$

$$f_0=\sqrt{f_{2_0} f_{1_0}}$$

and the dissipation factor of the staggered pair are determined by Equation 3

$$\delta=\frac{\Delta f}{f_0}$$

Values of $d$ and $\alpha$ being derived by Equations 6 and 7

$$d=\frac{1}{Q}=\sqrt{\frac{4+\delta^2-\sqrt{16+\delta^4}}{2}}$$

$$\alpha-\frac{1}{\alpha}=\sqrt{\delta^2-d^2}$$

Values of $f_1$ and $f_2$ being then determined by Equations 1 and 2

$$f_1=\frac{f_0}{\alpha}$$

$$f_2=\alpha f_0$$

Values of inductances $L_1$ and $L_2$ being derived from the definition of a tuned circuit:

$$L_1=\frac{1}{(2\pi f_1^2)C_1} \quad (10)$$

$$L_2=\frac{1}{(2\pi f_2^2)C_2} \quad (11)$$

with the values of $C_1$ and $C_2$ being selected arbitrarily; and the resistors to control the Q of each stage being determined by the following equations:

$$\text{first stage} = \frac{1}{2\pi f_1 C_1 d} \quad (12)$$

$$\text{second stage} = \frac{1}{2\pi f_2 C_2 d} \quad (13)$$

the characteristic curves for the said two individual amplifier stages being so related to one another that the numerical addition thereof results in the production of a composite characteristic curves having an essentially linear portion which extends substantially throughout the entire range of the said input signal.

References Cited by the Examiner

UNITED STATES PATENTS

| | | | |
|---|---|---|---|
| 2,451,893 | 10/1948 | Wallman | 330—154 |
| 2,681,391 | 6/1954 | Bradley | 330—154 |
| 2,710,314 | 6/1955 | Tongue et al. | 330—154 XR |
| 2,989,623 | 6/1961 | Byrne | 330—16 XR |

OTHER REFERENCES

Rheinfelder: I.-F. Amplifiers with the 2N741 Mesa Transistor, Motorola, AN–121, January 1961, 2 pages.

ROY LAKE, *Primary Examiner.*

N. KAUFMAN, F. D. PARIS, *Assistant Examiners.*